US010976256B2

(12) United States Patent
Rurack et al.

(10) Patent No.: US 10,976,256 B2
(45) Date of Patent: Apr. 13, 2021

(54) HIGHLY SELECTIVE AND SENSITIVE DETECTION OF 2,4,6-TRINITROTOLUENE BY MEANS OF FLUORESCENCE ENHANCEMENT USING UV-INDUCED PHOTOREACTION WITH ANIONS

(71) Applicant: Bundesrepublik Deutschland, Vertreten Durch Den Bundesrepublik Für Wirtschaft Und Energie, Berlin (DE)

(72) Inventors: Knut Rurack, Berlin (DE); Mustafa Biyikal, Berlin (DE)

(73) Assignee: Bundesrepublik Deutschland, Vertreten Durch Den Bundesrepublik Für Wirtschaft Und Energie, Berlin (DE)

( * ) Notice: Subject to any disclaimer, the term of this patent is extended or adjusted under 35 U.S.C. 154(b) by 336 days.

(21) Appl. No.: 16/191,602

(22) Filed: Nov. 15, 2018

(65) Prior Publication Data

US 2019/0154581 A1    May 23, 2019

(30) Foreign Application Priority Data

Nov. 17, 2017    (DE) .......................... 10 2017 127 167

(51) Int. Cl.
  *G01N 21/64*    (2006.01)
  *G01N 21/77*    (2006.01)
  *G01N 31/22*    (2006.01)
(52) U.S. Cl.
  CPC ......... *G01N 21/6428* (2013.01); *G01N 21/77* (2013.01); *G01N 31/22* (2013.01);
  (Continued)

(58) Field of Classification Search
  CPC ... G01N 2021/6439; G01N 2021/7756; G01N 2021/7759; G01N 2021/7786; G01N 21/6428; G01N 21/77; G01N 31/22
  See application file for complete search history.

(56) References Cited

U.S. PATENT DOCUMENTS

| 2015/0263299 A1* | 9/2015 | Liu | ..................... H01L 51/5221 257/40 |
| 2017/0038326 A1* | 2/2017 | Motayed | ............. G01N 33/004 |

FOREIGN PATENT DOCUMENTS

CN    102095709 A    6/2011

OTHER PUBLICATIONS

Sharma et al., "Absorption spectroscopic and FTIR studies on EDA complexes betewen TNT (2,4,6-trinitrotoluene) with amines in DMSO and determination of the vertical electron affinity of TNT", Elsevier, Spectrochimicu Acta Part A, 70(2008), pp. 144-153.

(Continued)

*Primary Examiner* — Jennifer Wecker
(74) *Attorney, Agent, or Firm* — Bachman & LaPointe, PC

(57) ABSTRACT

A method for detecting an analyte comprising 2,4,6-trinitrotoluene in a sample comprising: providing an indicator solution, comprising a cation and an anion; bringing in contact and/or interacting the indicator solution and the sample comprising the analyte; photocatalytically induced forming of an anionic TNT sigma complex, comprising the analyte and the anion, by means of exposure of the indicator solution and the sample brought in contact with one another; fluorescence optically detecting the formed anionic TNT sigma complex.

22 Claims, 4 Drawing Sheets

(52) U.S. Cl.
CPC ............. *G01N 2021/6439* (2013.01); *G01N 2021/7756* (2013.01); *G01N 2021/7759* (2013.01); *G01N 2021/7786* (2013.01)

(56) References Cited

OTHER PUBLICATIONS

Feng et al., "8-Hydroxyquinoline functionalized ZnS nanoparticles capped with amine groups: A fluorescent nanosensor for the facile and sensitive detection of TNT through fluorescence resonance energy transfer", Elsevier, Dyes and Pigments 97, (2013), 84-91.

Zhang et al. "Conjugation of PPV functionalized mesoporous silica nanoparticles with graphene oxide for facile and sensitive fluorescence detection of TNT in water through FRET", Elsevier, Dyes and Pigments 101, (2014), pp. 122-129.

Ao et al. "A theoretical investigation of the competitoin between hydrogen bonding and lone pair—π interation in complexes of TNT with NH3", Elsevier Computational and Theoretical Chemistry 1064, (2015), pp. 25-43.

Gheorghiu et al. "Amine-containing poly(vinylchloride) membranes for detecting polynitroaromatic vapors above and mines", Proceedings of SPIE, (1999), pp. 296-302.

Zhang et al. Instant Visual Detection of Trinitrotoluene Particles on Various Surfaces by Ratiometric Fluorescence of Dual-Emission Quantrum Dots Hybrid, Journal of the American Chemistry Society, (2011), pp. 8424-8427.

Tanwar et al. Fluorescence "Turn-On" Inidicator Displacement Assay-Based Sensing of Nitroexplosive 2,4,6-Trinitrophenol in Aqueous Media via a Polyelectrolyte and Dye Complex, ACS Omega (2017), 2, pp. 4424-4430.

Liu et al. "A colorimetric sensor based on anodized aluminum oxide (AAO) substrate for the detectionof nitroaromatics", Sensors and Actuators B 160 (2011) pp. 1149-1158.

Jamil et al. Molecular recognition of 2,4,6-trinitrotoluene by 6-aminohexanethiol and surface-enhanced Rama scattering sensor Sensors and Actuators B 221 (2015), pp. 273-280.

\* cited by examiner

HIGHLY SELECTIVE AND SENSITIVE DETECTION OF 2,4,6-TRINITROTOLUENE BY MEANS OF FLUORESCENCE ENHANCEMENT USING UV-INDUCED PHOTOREACTION WITH ANIONS

BACKGROUND OF THE INVENTION

The invention relates to the selective detection of 2,4,6-trinitrotoluene (TNT), optionally also from complex mixtures with other nitroaromatics, in the air, in aqueous solutions and on surfaces.

The majority of systems for detecting TNT offered presently in the market involve ion mobility spectrometry (IMS), gas chromatography (GC) and Raman and infrared (IR) spectroscopy techniques. In the commercial field, primarily IMS (such as SABRE 4000, Smiths Detection, USA) and Raman devices (such as FirstDefender RM, Ahura, USA) play a role. Moreover, several chemical methods such as chemiluminescent assays or molecular interaction sensors, such as fluorescent conjugated polymers, known as "amplifying fluorescent polymers" (AFPs), have been described. The fluorescence of these AFPs is weakened in the presence of TNT and other nitroaromatics.

The use of fluorescent conjugated polymers for the detection of explosives by means of fluorescence quenching is known. The majority of appropriate detection methods for TNT are based on the non-specific interaction of the AFPs and (non-)fluorescent dyes with substances that have a high oxidation potential.

Colorimetric detection methods of TNT and of trinitroaromatics and dinitroaromatics have a low selectivity and sensitivity with respect to TNT.

Against this background, a method is provided as disclosed herein. Further aspects, details, advantages, and characteristics of the present invention will be apparent from the dependent claims and the description.

SUMMARY OF THE INVENTION

According to a first embodiment, a method for detecting an analyte comprising trinitrotoluene is proposed. The proposed method comprises the following steps:
- providing an indicator solution, comprising a cation, an anion and a polar solvent, and in particular a polar aprotic solvent;
- interacting the indicator solution with the analyte;
- forming a complex, preferably photocatalytically, by exposing the indicator solution interacting with the analyte. The complex comprises the analyte and the anion.
- fluorescence optically detecting the formed complex; and
- optionally, assigning a fluorescence signal recorded during the detection to an amount or a concentration of the analyte.

Advantages of this embodiment are the high sensitivity of fluorescence optical measurement methods and the discrete emission band of the formed complex, allowing the specific detection of TNT. The fluorescence optical detection may take place qualitatively and/or at least semi-quantitatively. In particular, the fluorescence signal may include a fluorescence intensity, a relative fluorescence intensity or a fluorescence quantum yield. The analyte can advantageously be present in dissolved form in a solution, for example dissolved in an organic solvent, so that the interaction comprises a mixing of the indicator solution and the solution containing the analyte.

According to a further embodiment, the cation is selected from: a tetraalkylammonium cation; a trialkylammonium cation; and a dialkylammonium cation.

Advantageously, these cations have a relatively low charge density, so as not to electrostatically interact too strongly with the anions, and organic groups at the central ammonium nitrogen, so as to act in a solubility-enhancing manner.

According to a further embodiment, the anion is selected from: an acetate anion; a propionate anion, a butyrate anion; a carboxylate anion including a number of carbon atoms from 4 to 15; a phosphate anion; a hydrogen phosphate anion; a dihydrogen phosphate anion; a benzoate anion; a phenylacetate anion; a phenolate anion; a cyanide anion; a fluoride anion; a carbonate anion; a hydrogen carbonate anion; and a formate anion.

These anions are advantageous since they are sufficiently nucleophilic, while nonetheless being only weakly basic. Excessively alkaline anions would deprotonate the methyl group of TNT.

According to a further embodiment, the indicator solution comprises a polar, non-fluorescent solvent.

Advantages of this embodiment are an undisturbed fluorescence measurement. The polarity of the solvent promotes the formation of the analytically used complexes here.

According to a further embodiment, the tetraalkylammonium cation is selected from a tetrabutylammonium cation, a tetrahexylammonium cation and a tetraoctylammonium cation, and the anion is selected from an acetate anion, a benzoate anion or a phosphate anion.

Advantages of this embodiment will be described hereafter. The presence of an acetate anion, in particular, has proven to be advantageous for forming the fluorescence optically detected complexes.

According to a further embodiment, the polar, non-fluorescent solvent is selected from: diethylformamide, dipropylformamide, dimethylformamide, dibutylformamide, especially N,N-diethylformamide, N,N-dipropylformamide, N,N-dimethylformamide, N,N-dibutylformamide, 1-formylpyrrolidine, dimethyl sulfoxide, diethyl sulfoxide, dipropylsulfoxide, dibutylsulfoxide, tetrahydrothiophene 1-oxide, acetamide, N,N-dimethylacetamide, N,N'-diformyl-N,N'-dimethylethylenediamine (CAS.: 6632-41-3), N,N-diethylacetamide, 1,4-piperazine dicarboxaldehyde (Cas.: 4164-39-0) or diformamide derivatives, 1,3,5-triazine-1,3,5 (2H,4H,6H)-tricarboxaldehyde or triformamide derivatives, a polyamide, e.g., Nylon 6, a polyvinylpyrrolidone, a polyformamide, a polyacrylamide, a poly (N,N-dimethylacrylamide) and a polyethylene glycol. Moreover, polyethylene glycols, such as PEG 10,000 (melting point of 62 to 65° C.) and PEG 2,050 (melting point of 52 to 54° C.) or PEG 35.000 (melting point of 64-66° C.) are suitable, which can be used in pure form or in the form of mixtures with formamides or acetamides. Mixtures of the aforementioned liquid organic solvents with macromolecular compounds such as polyvinylpyrrolidone (Mn=10.000), polyacrylamides (such as Mn=150.000), poly(N,N-dimethylacrylamide) (e.g. Mn=10.000), polyformamides (e.g. poly(N-methyl-N-vinylformamide), poly(N,N-divinylformamide), poly(N-methyl-N-allylformamide), poly(N,N-diallylformamide, poly(N-methyl-N-homoallylformamide, poly(N,N-dihomoallylformamide) (e.g. Mn=2.000, 10.000, 20.000), and polyethylene glycols (e.g. Mn=2.050, 10.000, 35.000) are particularly preferred as non-fluorescent solvent or carrier substance for the formation of the fluorescent complexes. The molar masses indicated above are given only as examples.

Advantageously, the combination of the solvent diethylformamide (DEF), especially N,N-diethylformamide (DEF), provides the highest fluorescence of the TNT acetate complex after UV irradiation for the tetraoctylammonium cation and for the acetate anion, i.e., when tetraoctylammoniumacetate (TOAA) is used in the form of a salt dissolved in DEF. In combination with these ions, i.e., in the presence of TOAA, the solvent dipropylformamide, especially the solvent N,N-dipropylformamide provides the second-highest value for the fluorescence intensity of the TNT complex after UV irradiation. Further solvents such as dimethylformamide and dibutylformamide, especially N,N-dimethylformamide, N,N-dibutylformamide, dimethylsulfoxide and acetamide can also be used for detecting TNT using TOAA. The fluorescence intensity of the formed complexes, however, is approximately 40 to 60% lower than if the solvent used is DEF. This is also demonstrated by results achieved in experiments, which are summarized in Table 1. Advantageously, the use of diformamides, triformamides and polyformamides as well as polyethylene glycols allows the volatility of the solvent to be reduced. This makes a higher level of precision possible, since the concentration of the reaction batches does not change during the measurement. The solvents diformamide derivatives (left) and triformamide derivatives (right) are shown in the formulas below:

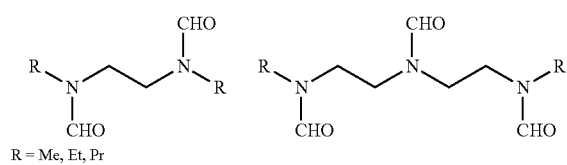

R = Me, Et, Pr

Even if polyamides, polyacrylamides, polyformamides and polyethylene glycols could not necessarily be understood as liquid solvents in the classical sense, but rather as macromolecular support materials with a low melting point, the anion, the cation and the potentially present analyte (TNT) are in direct contact with them. The anion, the cation and the potentially present analyte are—according to the proposed embodiments—molecularly dispersed, dissolved or adsorbed in relation to the respective solvent or carrier material. According to the literature, TOAA salt is a white solid. In our case, however, TOAA was obtained as a highly viscous liquid. The reason for this is the strongly hygroscopic property of TOAA. Even under vacuum or after storage with calcium hydride as desiccant, the TOAA could not be solidified or the (crystal) water could not be removed. This property surprisingly allows to use TOAA as a solvent for macromolecular carrier materials (polymers or solid (form)amides such as di- and triformamides). TOAA can be mixed in any ratio with these solid carrier materials. Di- and triformamides are solids. If the salt TOAA is present as a liquid, it is advantageous to liquefy them in the presence of TOAA. On this basis, in the case of TOAA being present as a liquid, according to an embodiment, it is proposed to use mixtures of di- and triformamides with TOAA as a sensor layer for the detection of the analyte. The sensor layer can be used in a microfluidic system for optical detecting TNT by fluorescence measurement.

The macromolecular substances mentioned above are advantageous in preventing crystallisation at the sensor and thus permit reproducible detection of the analyte. Especially preferred are combinations (here also called mixtures) of one of the mentioned organic solvents with one or more of the mentioned macromolecular carrier materials. Combinations of the solvents and carrier materials are listed in Table 3 and their advantageous properties are indicated. The mixtures have a higher viscosity than the pure organic solvents and are therefore less flowable. While the pure solvents or their mixtures allow the detection of the analyte in liquid samples or sample extracts without further ado, the addition of the designated macromolecular components facilitates the application of the proposed detection principle also for gaseous analytes. Microfluidic systems, for example chip-based microfluidic systems for single use, can be used to detect the analyte in the gas phase as well as in liquid extracts from soil or water samples. The reduced flowability of the material used to form the fluorescent analyte complexes is particularly advantageous: for example, a capillary of a microfluidic system can be coated with the mixture so that the analyte can also be detected when heated air potentially containing the analyte is passed through. The solvent/carrier mixture does not run out of the capillary during the handling of the microfluidic system, the fluorescence remains fixed and an otherwise occurring apparent loss of intensity can be reliably prevented. A further advantage of the mixtures described in Table 3 is the reduction of the vapour pressure. Microfluidic systems prepared for the detection of the analyte can be manufactured and stored in stock.

According to a further embodiment, the photocatalytically induced formation of the complex includes an exposure of the indicator solution interacting or brought in contact with the analyte in a wavelength range of 255 to 300 nm.

This wavelength range is advantageously outside the cut-off wavelength of most solvents mentioned herein, so that the UV irradiation is not absorbed by the solvent, and the photoreaction takes place. When using diethylformamide (DEF), especially when using N,N-diethylformamide, photocatalysis is still possible at 260 nm; at 255 nm, however, the reaction speed decreases drastically. This is also demonstrated by results achieved in experiments, which are summarized in Table 2. At wavelengths above 300 nm, the reaction speed also decreases since the complex is not photostable in this wavelength range.

The fluorescence intensity reaches the maximum thereof within 5 minutes, and the absorption band (λmax=426 nm) after 25 minutes under UV irradiation. It goes without saying that this time is dependent on the radiation source that is used, which is a fluorescence spectrometer used in the present case. With laser radiation, for example, it may thus also be considerably shorter, so that TNT may be detected within 10 seconds.

According to a further embodiment, the fluorescence optical detection includes an excitation of fluorescence of the formed complex at an excitation wavelength in a range of 400 nm to 500 nm, and a detection of a magnitude of a fluorescence in a range of 550 nm to 700 nm. In particular, the excitation takes place in a range of 400 to 450 nm, while the emission measurement takes place in a range of 550 to 700 nm.

Advantageously, for example, TNT, or the complex thereof formed after exposure to UV irradiation having a wavelength of 275 nm, absorbs light in the described range. The complex exhibits the most pronounced fluorescence in the described wavelength range of 550 to 700 nm.

According to a further embodiment, the recorded magnitude of the fluorescence includes a fluorescence intensity and/or a fluorescence quantum yield.

Advantageously, these variables recorded under standardized measuring conditions are suitable for the qualitative, and in particular the quantitative, in particular the semi-quantitative, detection of TNT.

According to a further embodiment, the recorded magnitude of the fluorescence is assigned to a known quantity or concentration of the analyte, so that a calibration of the method takes place. As an alternative, the recorded magnitude of the fluorescence is attributed to a known quantity or concentration of the analyte, for example in an organic solution, so that an at least semi-quantitative determination of the analyte takes place in a sample having an initially unknown concentration of the analyte. The organic solution is obtained by extraction of the sample. In particular, the organic solution can have been obtained by extraction of a water sample using an organic solvent. Likewise, the organic solution can have been obtained by transferring a solid residue into an organic solvent, for example from a hydrophobic surface. The analyst will be familiar with relevant methods of sample extraction from residue analysis.

Advantageously, with appropriate calibration, the measurement method is suitable for a high-precision quantitative detection of the analytes.

According to a further embodiment, a concentration of the anion forming the complex with the analyte in the indicator solution is between 20 and 220 mM, and in particular between 50 and 100 mM. This is the concentration of TOAA in DEF, i.e., in the indicator solution. For the detection of the analyte TNT, this is dissolved in an organic solvent (see below) or added as a solid, which does not significantly change the final concentration of TOAA in the solution to be measured. If the analyte TNT is added, for example, by means of 2 μL chloroform (see below), the concentration of the indicator solution (volume=100 μL; c=55 mM) changes only minimally by 1.1 mM. FIG. 2 shows the relative fluorescence intensity ($I/I_0$) at 577 nm using TNT or possible cross-reacting substances (in 2 μL chloroform, c=0.22 μM) in a TOAA/DEF solution (100 μL, 55 mM).

Advantageously, a preferred concentration of TOAA in diethylformamide (DEF) is 55 mM. The solution of TOAA in DEF is the indicator solution described here. When the TOAA concentration is reduced to 22 mM, the fluorescence intensity of the corresponding complex decreases by 32%. If, in contrast, the concentration of TOAA is increased to 110 mM, the fluorescence intensity of the complex decreases by only 5%. An ideal TOAA concentration range in DEF is therefore in the range of 50 to 100 mM. According to a practical exemplary embodiment, 100 μL of the indicator solution is used, wherein the amount of the solution containing TNT is 1 μL.

According to an exemplary embodiment, the indicator solution further comprises a known concentration of a reference substance for internal referencing. However, referencing may also take place in that a suitable dye in a suitable solvent, which does not necessarily have to be identical to the solvent in the TNT measurement channel, or in an appropriate matrix under identical optical measuring conditions supplies a fluorescence signal. The concentration of this reference substance is then typically set so that the intensity of the fluorescence signal of the reference is approximately in the middle of the dynamic range of the measurement channel. All dyes that can be excited in the range of 400 to 500 nm and fluoresce in the range of 550 to 700 nm are suitable reference substances, i.e., for example, a large number of coumarine, rhodamine, fluorescein, pyrromethene, styryl and cyanine dyes, such as Coumarine 6, 7, 153, 334 (coumarine laser dyes), DASBTI (styryl laser dye), DOCI, DMETCI (cyanine laser dyes), Fluorescein 27 (fluorescein laser dye), Pyrromethene 567, 580, 597 (pyrromethene laser dyes) or Rhodamine 19, 110, 6G (rhodamine laser dyes).

Advantageously, this allows instantaneously conducted measurements to be continuously checked.

According to a further embodiment, the "interacting" step is preceded by an enrichment of the analyte from a sample of hydrophobic carrier material. For example, a fluid, such as air or water, can be conducted through or onto a hydrophobic material to enrich the analyte on the carrier material. The enrichment takes place at room temperature. The carrier material enriched with the analyte can be mixed with an indicator solution (use as a test strip) or rinsed/sublimed in a measuring chamber (microfluidic system). The sensitivity of the measurement increases with increasing interaction time. Likewise, the residue enriched on the hydrophobic carrier material can be transferred from the carrier material into a known volume of a solvent, for example of an organic solvent. In this way, an organic solution containing the analyte is formed. Proceeding from the known quantity of the extract and the underlying sample volume (air volume, water volume, mass of the soil sample), the original concentration in the sample (air, water, soil) can be calculated.

Advantageously, the interaction time of the indicator solution and analyte interacting with one another, i.e., brought in contact or mixed with one another, can be just a few seconds, depending on the field of application, preferably for applications in the military field and in the security field. As an alternative, it may be multiple hours, e.g., in the field of environmental analytics. However, if air presumably containing the analyte is introduced directly into the indicator solution, the use of a carrier material is not necessary. It is also possible to use acid or neutral TNT samples in water and in organic solvents. Acetate/acetic acid mixtures are used as buffers. An excess of TOAA may thus be helpful in the case of acid samples. The pH value of the TOAA/DEF indicator solution (220 mM) ranges between pH 7 and 8. The pH value of the pure solvent DEF ranges between pH 6 and 7.

According to a further embodiment, the hydrophobic carrier material is selected from polybenzyl methacrylate, polystyrene or another hydrophobic material that preferably does not take up water. It is immaterial whether the hydrophobic material in question is used with or without a cross-linking agent. According to this embodiment, the use of hydrophobized cellulose or of silica materials, for example a hydrophobic chromatographic carrier material such as C18Si, C12Si, and of Teflon is also possible.

According to a further embodiment, the complex comprising the analyte and the anion is an anionic sigma complex.

According to a further embodiment, the use of UV light is proposed for the catalytic formation of a complex of nitroaromatic explosives with an anion, which is utilized for the qualitative and/or quantitative detection of the nitroaromatic explosives. The complex in question comprises TNT and an anion, which is selected from an acetate anion, a benzoate anion and a phosphate anion.

The photocatalytic reaction of TNT with anions has not been employed in the past and is therefore novel. TNT reacts with amines and anions, or with nucleophiles, even without UV irradiation. However, strongly light-absorbing complexes are formed in the process, which do not fluoresce or fluoresce only minimally. Hydroxide ions and amines are frequently used nucleophiles. In combination with the tetraoctylammonium counterion, which has not been previously used for TNT detection, the anions selected in our case, preferably acetate anions, surprisingly show a very pronounced increase in fluorescence upon reaction with TNT. The reason for the strong increase in fluorescence is presumably also that the anions used here, due to the low basicity thereof, are not able to deprotonate the methyl group of TNT as quickly as the hydroxide anions or amines, resulting in the formation of strongly absorbing species, which are no longer able to react to form the fluorescent complex. Hydroxides and amines do not carry any electron withdrawing groups. One possible or further reason for the formation of non-fluorescent complexes is the formation of a strong dipole. An acetate, in contrast, carries a carbonyl group, which prevents the formation of a strong dipole in the complex and thus enables the light-induced charge transport in the complex. Surprisingly, a fluorescent species is created after UV irradiation (see FIG. 1). As is apparent from the absorption spectrum in FIG. 1 (ordinate A: absorption), a new species (anionic sigma complex) having an absorption maximum of 425 nm is created after UV irradiation. The absorption spectrum in FIG. 4 shows that the same fluorescent species is created during the reaction of TOAA with TNT (with UV irradiation) or TNB (without UV irradiation). The reaction of TNB to yield anionic sigma complexes (even without UV irradiation) is known: J. Org. Chem. 1980, 45 471-475; Angew. Chem. Int. Ed. 2007, 46, 1995-1998. Directly detecting that this is an (anionic) sigma complex, however, is extremely difficult. Proceeding from the present information, it is therefore assumed that the highly fluorescent complexes observed here are anionic sigma complexes. A sigma complex shall be understood to mean the product that is formed by the attachment of an electrophilic or nucleophilic group or of a radical to a ring carbon of an aromatic species, forming a new sigma bond. TNB also forms fluorescent anionic sigma complexes without UV light.

According to a further embodiment, the use of a complex, and in particular of an anionic sigma complex, comprising TNT and an anion for the fluorescence optical detection or for the fluorescence optical quantification of TNT in a sample, and in particular in an environmental sample, is proposed. An environmental sample shall be understood to mean a sample taken from the environment, in particular a sample taken from soil, air or water.

A photocatalytic reaction of TNT with anions to yield a fluorescent complex, and in particular a fluorescent anionic sigma complex, has not been previously described. The photocatalytic reaction to yield a complex, and in particular an anionic sigma complex, appears to be decisive for the selectivity and sensitivity of the method proposed according to the invention, using the described indicator solution. TNT reacts photocatalytically with the anions, preferably with TOAA, to yield a highly fluorescent complex, the detection of which according to the invention is used to detect TNT. Thus, in the present case, anionic sigma complex of the TNT are detected optically by fluorescence.

According to a further embodiment of the proposed use, the used anion is selected from an acetate anion, a benzoate anion or a phosphate anion. However, the anion can also be selected from a propionate anion, a butyrate anion, a carboxylate anion including a number of carbon atoms from 4 to 15, a hydrogen phosphate anion; a dihydrogen phosphate anion, a benzoate anion, a phenolate anion, a phenylacetate anion, a cyanide anion, a fluoride anion, a carbonate anion, a hydrogen carbonate anion, and a formate anion. Tetraoctylammonium carbonate, tetraoctylammonium hydrogen carbonate and tetraoctyl ammonium formate can also react with TNT. The corresponding cation is advantageously selected from a tetraalkylammonium cation, a trialkylammonium cation, and a dialkylammonium cation.

The photocatalytic formation of the fluorescent complex of TNT was not previously known. Previously, amines and strong nucleophiles, such as hydroxide anions, were used as nucleophiles; however, the complexes thus formed had merely a high absorption and were therefore out of the question for the quantification of TNT. The anions used according to the invention, in contrast, are weak bases, which form fluorescent compounds with TNT only as a result of UV irradiation. Weakly coordination anions, in contrast, such as chloride, bromide, iodide, perchlorate, phosphorus hexafluoride, triflate, bisulfate, sulfate, nitrate, etc. do not appear to be suitable.

According to another embodiment, a sensor comprising a sensor layer is proposed for the optical detection of TNT by means of fluorescence. The sensor layer is arranged on a substrate. Typically, the TNT is present in a fluid where the fluid is either a gas or a liquid used for extraction of TNT from an environmental sample. The gas can be air or an inert gas, the liquid can for example be a liquid extract from an environmental sample suspected to contain the analyte TNT. The sensor layer comprises the indicator solution described above, i.e. at least one of the cations mentioned above, at least one of the anions mentioned above and at least one of the polar solvents mentioned above. Typically, the polar solvent is not fluorescent at the wavelength or wavelength range selected for fluorescence optical detection of the described above TNT complex.

According to preferred embodiments, the sensor layer comprises a mixture of solvents or carriers of different volatility (different gas pressures), the mixture being prepared so that the component with the lowest volatility has the highest mass fraction in the mixture. Typical mass fractions range from 10:1 to 1:1. For example, mass fractions of the mixture of the compound with the lower volatility to the compound with the higher volatility may be 10:1, 9:1, 8:1, 7:1, 6:1, 5:1, 4:1, 3:1, 2:1, 1:1 or an intermediate numerical ratio. For example, their mass ratio can be 19:2, 17:2, 15:2, 13:2, 11:2, 9:2, 7:2, 5:2 or 3:2. The viscosity of the sensor layer can thus be advantageously adjusted to ensure reproducible measurement and fixed fixation of the fluorescence signal at the respective sensor temperature or the temperature of a heated gas or air stream carrying the analyte. In the case of using a mixture of solvents (carrier substances) present as solids at room temperature (20° C.), the compound bearing the amide group should have the highest proportion in the mixture. Typical mixing ratios (mass fractions) are 5:1 to 2:1, for example 5:1, 4:1, 3:1, 2:1 or intermediate ratios, e.g. 9:2, 7:2, 5:2 or 3:2. If the indicator solution or sensor layer contains an organic solvent that is liquid at room temperature, the substrate on which the sensor layer is applied can be cooled. However, if the sensor layer comprises non-volatile components or is made non-volatile by their addition, the cooling is not necessary and the presumable TNT-containing air or carrier gas flow can be heated up to 150° C.

The above-described embodiments can be arbitrarily combined with one another.

The above-mentioned tables are provided hereafter.

TABLE 1

Examination of the influence of the selected solvent on the relative fluorescence intensity $I/I_0$ for the measurement of TNT (in 7.3 μL chloroform, c = 220 μM), which was added to a TOAA solution in a polar solvent (100 μL, c = 220 mM), after 1 h at room temperature, and tracked further at room temperature under the following experimental condition: excitation wavelength 425 nm, gap width/exc. 0.5 nm, emission wavelength 590 nm, gap width 5.0 nm; emission maximum ($\lambda_{em}$); absorption maximum ($\lambda_{abs}$); relative fluorescence intensity ($I/I_0$); *after 5 min of UV irradiation.

| Solvent | $\lambda_{em}$ [nm] | $\lambda_{abs}$ [nm] | $I/I_0$ | $\lambda_{abs}$* [nm] | $I/I_0$* |
|---|---|---|---|---|---|
| N-methylformamide | 604 | 440 | 0.001 | 424 | 0.01 |
|  |  | 525 |  | 525 |  |
| N,N-dimethylformamide | 585 | 380 | 0.08 | 380 | 0.56 |
|  |  | 508 |  | 429 |  |
|  |  | 527 |  | 508 |  |
|  |  | 645 |  | 527 |  |
|  |  |  |  | 645 |  |
| N,N-diethylformamide | 577 | 380 | 0.18 | 380 | 1.0 |
|  |  | 508 |  | 426 |  |
|  |  | 530 |  | 508 |  |
|  |  | 645 |  | 530 |  |
|  |  |  |  | 645 |  |
| N,N-dipropylformamide | 575 | 380 | 0.12 | 380 | 0.88 |
|  |  | 508 |  | 426 |  |
|  |  | 531 |  | 508 |  |
|  |  | 645 |  | 531 |  |
|  |  |  |  | 645 |  |
| N,N-dibutylformamide | 576 | 380 | 0.07 | 368 | 0.48 |
|  |  | 509 |  | 380 |  |
|  |  | 532 |  | 427 |  |
|  |  | 649 |  | 509 |  |
|  |  |  |  | 532 |  |
|  |  |  |  | 649 |  |
| N-formylpipiridine | 579 | 380 | 0.07 | 380 | 0.29 |
|  |  | 510 |  | 429 |  |
|  |  | 533 |  | 510 |  |
|  |  | 648 |  | 533 |  |
|  |  |  |  | 648 |  |

TABLE 1-continued

Examination of the influence of the selected solvent on the relative fluorescence intensity $I/I_0$ for the measurement of TNT (in 7.3 μL chloroform, c = 220 μM), which was added to a TOAA solution in a polar solvent (100 μL, c = 220 mM), after 1 h at room temperature, and tracked further at room temperature under the following experimental condition: excitation wavelength 425 nm, gap width/exc. 0.5 nm, emission wavelength 590 nm, gap width 5.0 nm; emission maximum ($\lambda_{em}$); absorption maximum ($\lambda_{abs}$); relative fluorescence intensity ($I/I_0$); *after 5 min of UV irradiation.

| Solvent | $\lambda_{em}$ [nm] | $\lambda_{abs}$ [nm] | $I/I_0$ | $\lambda_{abs}$* [nm] | $I/I_0$* |
|---|---|---|---|---|---|
| Dimethyl sulfoxide | 587 | 380 | 0.25 | 380 | 0.42 |
|  |  | 429 |  | 429 |  |
|  |  | 522 |  | 522 |  |
|  |  | 640 |  | 640 |  |
| Acetonitrile | 585 | 380 | 0.15 | 380 | 0.17 |
|  |  | 522 |  | 426 |  |
|  |  | 640 |  | 510 |  |
|  |  |  |  | 640 |  |

TABLE 2

Screening of the parameters for UV irradiation and excitation for the measurement TNT (in 7.3 μL chloroform, c = 220 μM) introduced into a TOAA solution in DEF (100 μL, c = 220 mM). Immediately after starting the reaction mixtures, these were irradiated with UV light for 5 minutes. Wavelength of the UV light ($\lambda_{UV}$); UV irradiation gap width (UV irr.); excitation gap at 425 nm (exc.); relative fluorescence intensity after 5 minutes of UV irradiation ($I/I_0$*); measuring instrument: FluoroMax(R)-4 (Horiba Scientific)

| No. | $\lambda_{UV}$ [nm] | UV irr. gap width [nm] | UV exc. gap width [nm] | $I/I_o$* |
|---|---|---|---|---|
| 1 | 300 | 5 | 2 | 0.69 |
| 2 | 285 | 5 | 2 | 0.82 |
| 3 | 268 | 5 | 2 | 0.96 |
| 4 | 265 | 5 | 2 | 0.77 |
| 5 | 260 | 5 | 2 | 0.56 |
| 6 | 255 | 5 | 2 | 0.12 |
| 7 | 275 | 2.5 | 2 | 0.35 |
| 8 | 275 | 7.5 | 2 | 0.86 |
| 9 | 275 | 5 | 1 | 1.0 |
| 10 | 275 | 5 | 2 | 0.88 |

TABLE 3

Exemplary mixtures of solvents and/or carrier substances for use in a sensor layer for the fluorescence optical detection of TNT.

|  | N,N-diethylformamide | N,N-dipropylformamide | N,N-dimethylformamide | N,N-dibutylformamide | 1-formylpyrrolidine | dimethyl sulfoxide | diethyl sulfoxide | dipropyl sulfoxide | dibutyl sulfoxide |
|---|---|---|---|---|---|---|---|---|---|
| N,N-diethylformamide | / |  |  |  |  |  |  |  |  |
| N,N-dipropylformamide | C | / |  |  |  |  |  |  |  |
| N,N-dimethylformamide | C | C | / |  |  |  |  |  |  |
| N,N-dibutylformamide | C | C | C | / |  |  |  |  |  |
| 1-formylpyrrolidine | C | C | C | C | / |  |  |  |  |
| dimethyl sulfoxide | C | C | C | C | C | / |  |  |  |
| diethyl sulfoxide | C | C | C | C | C | C | / |  |  |
| dipropyl sulfoxide | C | C | C | C | C | C | C | / |  |
| dibutyl sulfoxide | C | C | C | C | C | C | C | C | / |
| tetrahydrothiophene 1-oxide | C | C | C | C | C | C | C | C | C |
| acetamide | B | B | B | B | B | B | B | B | B |
| N,N-dimethylacetamide | C | C | C | C | C | C | C | C | C |
| N,N'-diformyl-N,N'-dimethylethylenediamine | B | B | B | B | B | B | B | B | B |
| N,N-diethylacetamide | C | C | C | C | C | C | C | C | C |
| 1,4-piperazine dicarboxaldehyde | A | A | S | A | A | A | A | A | A |
| diformamide derivatives | A | A | A | A | A | A | A | A | A |
| 1,3,5-triazine-1,3,5-(2H,4H,6H)-tricarboxaldehyde | A | A | A | A | A | A | A | A | A |

TABLE 3-continued

Exemplary mixtures of solvents and/or carrier substances for use in a sensor layer for the fluorescence optical detection of TNT.

| | | | | | | | | | |
|---|---|---|---|---|---|---|---|---|---|
| triformamide derivatives | A | A | A | A | A | A | A | A | A |
| polyvinylpyrrolidone | A | A | A | A | A | A | A | A | A |
| polyformamides | A | A | A | A | A | A | A | A | A |
| polyacrylamides | A | A | A | A | A | A | A | A | A |
| polyethylene glycols | A | A | A | A | A | A | A | A | A |
| PEG 35.000 | A | A | A | A | A | A | A | A | A |
| PEG 10.000 | A | A | A | A | A | A | A | A | A |
| PEG 2.050 | A | A | A | A | A | A | A | A | A |

| | tetrahydrothiophene 1-oxide | acetamide | N,N-dimethylacetamide | N,N'-diformyl-N,N'-dimethylethylenediamine | N,N-diethylacetamide | 1,4-piperazine dicarboxaldehyde | diformamide derivatives |
|---|---|---|---|---|---|---|---|
| N,N-diethylformamide | | | | | | | |
| N,N-dipropylformamide | | | | | | | |
| N,N-dimethylformamide | | | | | | | |
| N,N-dibutylformamide | | | | | | | |
| 1-formylpyrrolidine | | | | | | | |
| dimethyl sulfoxide | | | | | | | |
| diethyl sulfoxide | | | | | | | |
| dipropyl sulfoxide | | | | | | | |
| dibutyl sulfoxide | | | | | | | |
| tetrahydrothiophene 1-oxide | / | | | | | | |
| acetamide | B | / | | | | | |
| N,N-dimethylacetamide | C | C | / | | | | |
| N,N'-diformyl-N,N'-dimethylethylenediamine | B | B | B | / | | | |
| N,N-diethylacetamide | C | C | C | C | / | | |
| 1,4-piperazine dicarboxaldehyde | A | B | A | A | A | / | |
| diformamide derivatives | A | C | A | A | A | B | / |
| 1,3,5-triazine-1,3,5-(2H,4H,6H)-tricarboxaldehyde | A | C | A | A | A | C | A |
| triformamide derivatives | A | C | B | C | B | C | A |
| polyvinylpyrrolidone | A | C | A | A | A | C | A |
| polyformamides | A | A | A | A | A | C | A |
| polyacrylamides | A | A | A | A | A | C | A |
| polyethylene glycols | A | A | A | A | A | A | A |
| PEG 35.000 | A | A | A | A | A | A | A |
| PEG 10.000 | A | A | A | A | A | A | A |
| PEG 2.050 | A | A | A | A | A | A | A |

| | 1,3,5-triazine-1,3,5(2H,4H,6H)-1,3,5-tricarboxaldehyde | triformamide derivatives | polyvinylpyrrolidones | polyformamides | polyacrylamides | polyethylene glycols | PEG 35.000 | PEG 10.000 | PEG 2.050 |
|---|---|---|---|---|---|---|---|---|---|
| N,N-diethylformamide | | | | | | | | | |
| N,N-dipropylformamide | | | | | | | | | |
| N,N-dimethylformamide | | | | | | | | | |
| N,N-dibutylformamide | | | | | | | | | |
| 1-formylpyrrolidine | | | | | | | | | |
| dimethyl sulfoxide | | | | | | | | | |
| diethyl sulfoxide | | | | | | | | | |
| dipropyl sulfoxide | | | | | | | | | |
| dibutyl sulfoxide | | | | | | | | | |
| tetrahydrothiophene 1-oxide | | | | | | | | | |
| acetamide | | | | | | | | | |
| N,N-dimethylacetamide | | | | | | | | | |
| N,N'-diformyl-N,N'-dimethylethylenediamine | | | | | | | | | |
| N,N-diethylacetamide | | | | | | | | | |
| 1,4-piperazine dicarboxaldehyde | | | | | | | | | |
| diformamide derivatives | | | | | | | | | |
| 1,3,5-triazine-1,3,5-(2H,4H,6H)-tricarboxaldehyde | / | | | | | | | | |
| triformamide derivatives | C | / | | | | | | | |
| polyvinylpyrrolidone | C | A | / | | | | | | |
| polyformamides | C | C | C | / | | | | | |
| polyacrylamides | C | A | C | C | / | | | | |
| polyethylene glycols | A | A | A | A | A | / | | | |
| PEG 35.000 | A | A | A | A | A | C | / | | |

TABLE 3-continued

Exemplary mixtures of solvents and/or carrier substances for use in a sensor layer for the fluorescence optical detection of TNT.

| PEG 10.000 | A | A | A | A | A | C | C | / | |
| PEG 2.050 | A | A | A | A | A | C | C | C | / |

Therein indicates A - excellent means: pronounced reduction of flowability, significant increase of viscosity or gel formation; B - less suitable means: slight reduction of evaporation tendency above 60° C.; C - no significant improvement: the viscosity of the mixture is only insignificantly changed compared to the viscosity of the individual components.

Previously known detection techniques for TNT have a variety of disadvantages. The IMS methods described at the outset, for example, are based on a radioactive source and often exhibit disadvantageous drift. GC techniques require a carrier gas reservoir. Chemical sensors, in contrast, have the advantage that they are usually very selective and cross sensitivities can be minimized; the disadvantage of these sensors, however, in general is inadequate broadband detection. The disadvantage of Raman methods, which are also used, is that Raman spectrometers are often not battery-operated, and consequently are not suitable for mobile use, and are susceptible to non-specific fluorescence. Laser-based methods are also usually not battery-operated and are frequently subject to strong matrix effects.

The existing cross sensitivities of the fluorescent sensor materials for TNT that are, at present, considered to be leading in terms of technology can result in false alarms by interacting with substances that have a high oxidation potential or a high concentration. This causes the sensitivity for the respective explosive to decrease. This adversely affects the overall effectiveness and the acceptance of the methods in the market. For this reason, the field of use of the previously developed fluorescence-based methods for the detection of TNT is very limited.

As far as colorimetric methods are concerned, strongly light-absorbing complex are formed during the reaction of nitroaromatics with nucleophiles, which, however, allow the colorimetric detection of TNT only in a high concentration range. In addition to changes to the absorption properties as a function of the environmental conditions, the methods for the detection of TNT known to date show high cross sensitivity with respect to mononitroaromatics, dinitroaromatics and trinitroaromatics as well as to substances having a high oxidation potential or high substance concentrations.

In the field of environmental analytics, TNT is detected in the field by means of mobile devices, such as those also used in the security field. Traditional environmental analytical methods require laboratories, are cost-intensive and time-consuming, and are not suitable for on-site use. For example, after the sample has been taken and transported into the laboratory, TNT is generally detected in environmental samples after digestion of the sample and purification by means of traditional HPLC methods.

In contrast, the proposed method is suitable for the rapid, simple, reliable, qualitative and quantitative detection of 2,4,6-trinitrotoluene (TNT) in the air, in solutions and on surfaces, including directly on-site. The only prerequisite is the presence of a UV light source. Moreover, the method is cost-efficient since the proposed indicator solution does not contain any expensive reagents. With appropriate additions, the indicator solution can advantageously be configured for internal referencing. It is easy to produce, not perishable and can even be used multiple times. The anion is present in excess. If after the measurement no reaction with an analyte (e.g., TNT) is observed, the indicator solution can be reused. Against this background, the proposed method is advantageously suitable for long-term and ongoing measurements (monitoring) in large halls, in military facilities, in water lines, in wells and in the groundwater.

Surprisingly, it was found that an UV exposure of TNT in the presence of certain anions catalyzes the reaction to yield an anionic TNT sigma complex. The highly specific fluorescence signal of the anionic sigma complex of TNT is suitable for detecting the presence of the TNT. The basis of the specific detection of TNT proposed here is thus the formation of a fluorescent anionic TNT sigma complex, which is formed by a UV-induced (photo)reaction with non-fluorescent anions (preferably acetate, benzoate or phosphate) in polar non-fluorescent solvents.

In contrast to the previously known optical methods, the method described here can be used to detect TNT in a highly selective and sensitive manner, even in a complex mixture comprising mononitroaromatics, dinitroaromatics and trinitroaromatics in the air, in water and on surfaces, using the non-fluorescent indicator solution, by the formation of fluorescent anionic sigma complexes.

Advantageously, the TNT indicator solution is stable in air and water and can be used under a variety of climatic or seasonal conditions, both at temperatures around and below the freezing point and at an ambient temperature of up to 50° C. A concentration of the indicator substance (anion+cation) in the reaction batch is advantageously 20 mM to 220 mM. The concentration of an indicator substance comprising tetraoctylammonium acetate (TOAA), i.e., of tetraoctylammonium cations including acetate anions, can thus be in the range of 20 mM to 220 mM.

The proposed detection method can advantageously include an enrichment of TNT on a hydrophobic surface prior to the actual analysis. The enrichment takes place by means of incident flow of the contaminated air or water sample and reaction of TNT-contaminated surfaces with the non-fluorescent indicator solution. It is also possible to prepare material of a swipe sample. The (potentially) contaminated surface is wiped off, for example, with a wad or ball of fibers or (aluminum) foil. The analyte can optionally be dissolved from the wiping material. Thereafter, the solution or the material is exposed to UV irradiation (265 to 300 nm), and the fluorescence of the formed complexes in the reaction mixture is excited at a wavelength, for example of 425 nm. Thereafter, an increase in fluorescence is detected on the sensor and read out via a fluorescence read unit for the selective detection of TNT, for example at 575 nm.

According to a practical exemplary embodiment, the (air or water) sample (presumably) contaminated with TNT is conducted over a non-fluorescent, hydrophobic organic material or into a UV-permeable container in the measuring device. The hydrophobic surface area enriched with TNT, or the container filled with the fluid, is then mixed with the TNT indicator solution (0.5 to 50 µL). During the photoreaction of TNT with the indicator solution, fluorescent anionic TNT sigma complexes (excitation maximum: 425 nm; emission maximum: 575 nm) are formed. Due to the high specificity of the UV-induced (photo)reaction between TNT and the indicator solution, TNT can be unambiguously detected in pure form or in a mixture of as many as 10 different nitroaromatics.

BRIEF DESCRIPTION OF THE DRAWINGS

Further description of the invention follows, with reference to the attached drawings, wherein.

DETAILED DESCRIPTION

Figure 1:
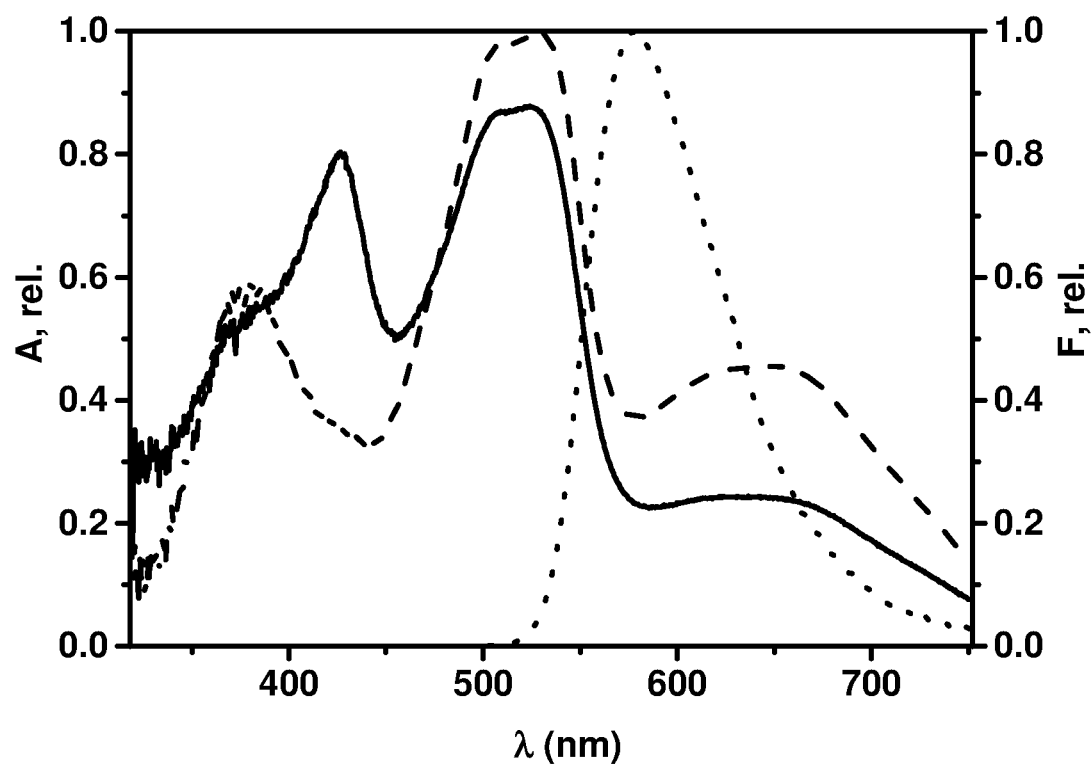
FIG. 1 shows standardized absorption and fluorescence spectra of TNT (in 7.3 μL chloroform, c=0.22 mM) in a TOAA/DEF solution (100 μL, c=220 mM) before (dashed) and after (solid and dotted) UV irradiation at 275 nm lasting 5 minutes.

FIG. 1 shows standardized absorption and fluorescence spectra of TNT (in 7.3 μL chloroform, c=0.22 mM) in a TOAA/DEF solution (100 μL, c=220 mM) before (dashed) and after (solid and dotted) UV irradiation at 275 nm lasting 5 minutes. A denotes absorption (relative units), F denotes fluorescence (relative units), and λ denotes the respective wavelength (nm).

The formation of the TNT TOAA complex caused the strongest increase in fluorescence in DEF. As a result of the irradiation of a TNT TOAA solution in anhydrous DEF with UV light (275 nm), an acceleration of the reaction was observed within 5 minutes, which resulted in a decrease in the pronounced absorption bands of the charge transfer complex and a simultaneous amplification of a new absorption peak at 426 nm and fluorescence enhancement ($\lambda_{max}$=577 nm) (see FIG. 1).

The compounds show the greatest fluorescence in the emission wavelength range described above (see FIG. 1).

Figure 2:
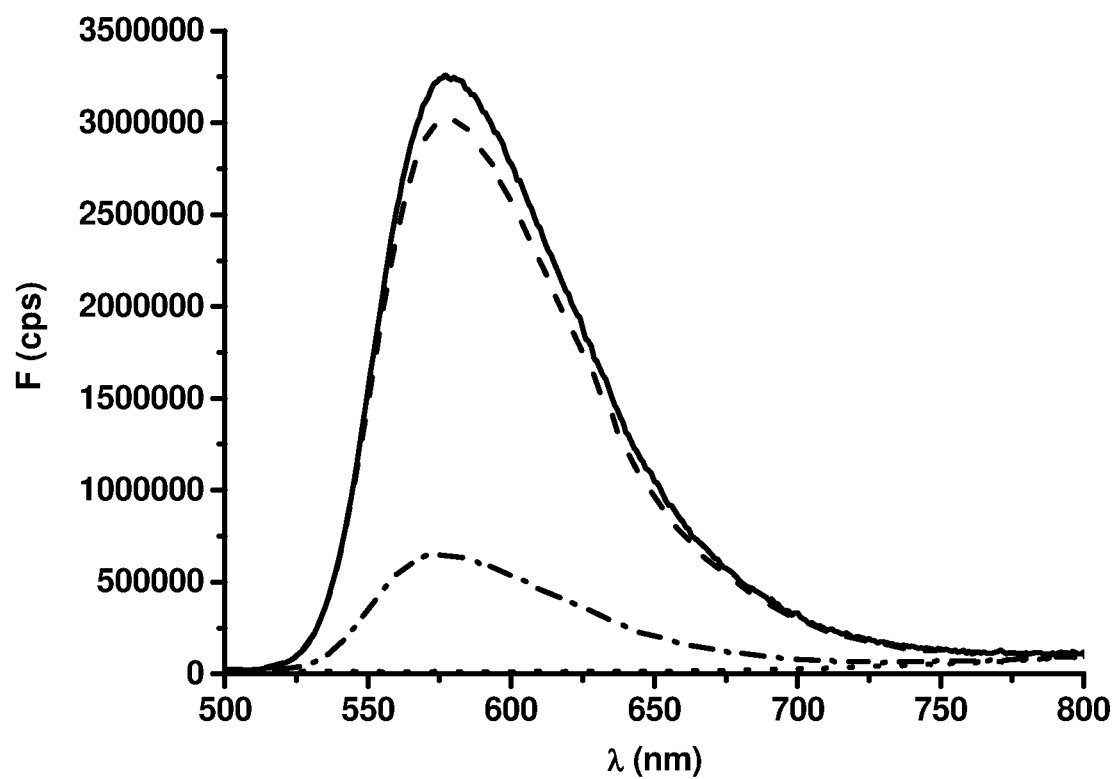
FIG. 2 shows fluorescence spectra of the reaction batches with TNT in TOAA/DEF without TNT (dotted) and with TNT after UV irradiation at 275 nm for 5 min (solid) and for another 5 min (dashed); dot-dash: 5 min irradiation at 425 nm.

FIG. 2 shows fluorescence spectra of the reaction batches with TNT in TOAA/DEF without TNT (dotted) and with TNT after UV irradiation at 275 nm for 5 min (solid) and for another 5 min (dashed); dot-dash: 5 min irradiation at 425 nm. The ordinate designation F denotes the fluorescence intensity.

In particular, FIG. 2 shows that the fluorescence of the TNT/TOAA reaction batch in DEF has a decreasing fluorescence intensity (dashed) with further UV irradiation (275 nm). It was possible to dramatically enhance this decrease when irradiation (5 min) was carried out at the absorption maximum (at 425 nm), which indicates that the anionic sigma complexes in the reaction batch are not photostable (dot-dash).

In all other indicator solutions, the concentration is likewise 20 to 220 mM. Using an indicator solution amount of 100 μL, it is possible to use or detect 0.1 to 1000 μL TNT solutions in aprotic organic solvents and 0.1 to 20 μL TNT water samples.

Figure 3:
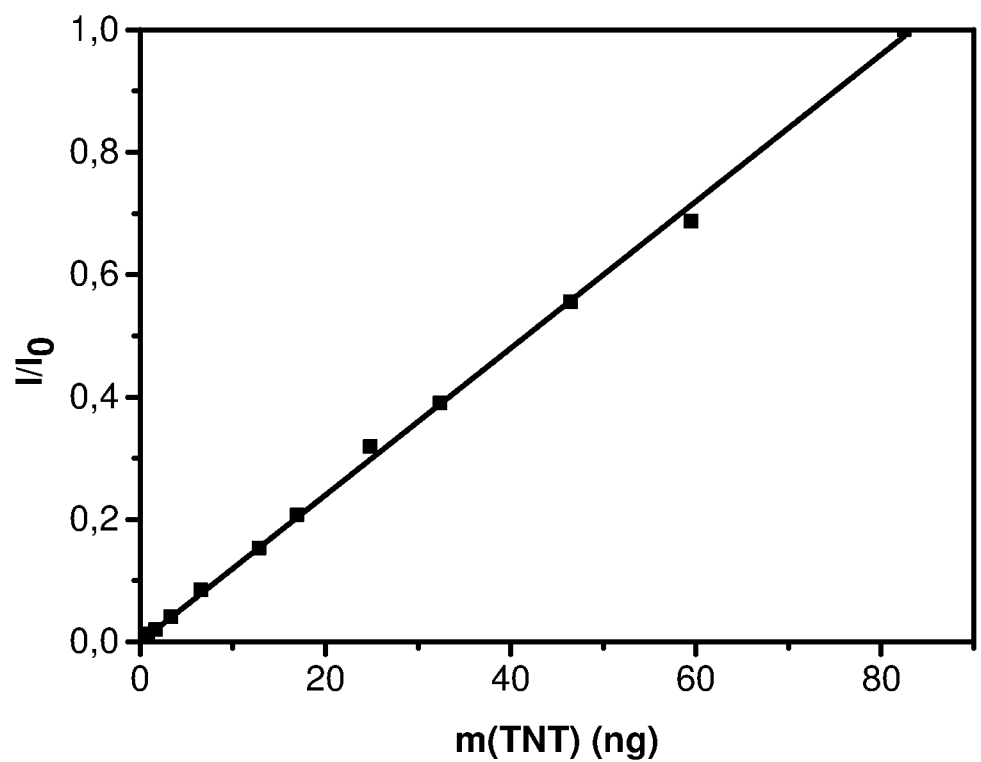
FIG. 3 shows the relative fluorescence intensity $I/I_0$ plotted against the amount of TNT that, dissolved in a volume of 7.3 μL chloroform, was introduced into a TOAA/DEF solution (100 μL, c=55 mM) after 5 minutes of UV irradiation at 275 nm.

FIG. 3 shows the relative fluorescence intensity $I/I_0$ plotted against the amount of TNT that, dissolved in a volume of 7.3 μL chloroform, was introduced into a TOAA/DEF solution (100 μL, c=55 mM) after 5 minutes of UV irradiation at 275 nm. From the progression of the calibration curve results the option of reliably detecting TNT up to an absolute amount of 0.2 ng for the conditions described here.

Figure 4:
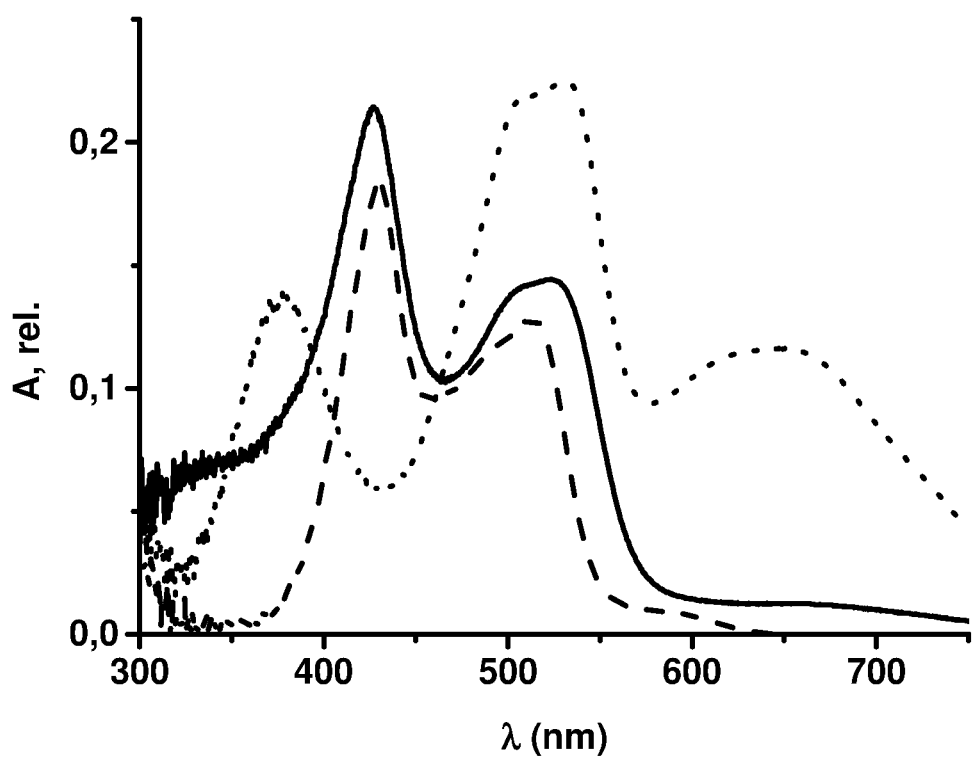
FIG. 4 shows the absorption spectra of the TNA reaction batch in TOAA/DEF without irradiation (dotted), after 25 min of UV irradiation at 275 nm (solid), and of the TNB reaction batch without UV irradiation in TOAA/DEF (dashed)

FIG. 4 shows the absorption spectra of the TNA reaction batch in TOAA/DEF without irradiation (dotted), after 25 min of UV irradiation at 275 nm (solid), and of the TNB reaction batch without UV irradiation in TOAA/DEF (dashed).

The gist of the invention relates to the highly selective and sensitive detection of TNT using a non-fluorescent indicator solution, which forms fluorescent anionic TNT sigma complexes in the reaction mixture in the presence of TNT after UV irradiation. Due to the high specificity of the photoreaction between TNT and the anions in the polar solution, an increase in fluorescence is only observed in the case of TNT under these measuring conditions. Thus, a differentiation of TNT from mononitroaromatics, dinitroaromatics and other trinitroaromatics is possible even in a complex mixture.

Advantages of the proposed method and of the use of the described indicator solution are, in particular, high selectivity and sensitivity. Moreover, low costs are characterizing since additionally the complex synthesis of conjugated polymers, dyes, antibodies, etc. can be dispensed with. The method is easy to validate and can also be used by untrained staff for the highly selective and sensitive detection of TNT. It is suitable for the long-term monitoring of military facilities, the long-term monitoring of water lines, (offshore), and for the search for contaminations, for example based on analyses of groundwater.

In summary, a method for detecting an analyte comprising 2,4,6-trinitrotoluene is proposed. TNT can be present in dissolved form in an aqueous or organic solvent. The method comprises: providing an indicator solution. The indicator solution comprises a cation, an anion and a polar solvent. The cation is selected from: a tetraalkylammonium cation; a trialkylammonium cation; and a dialkylammonium cation. The anion is selected from: an acetate anion; a propionate anion; a butyrate anion; a carboxylate anion including a number of carbon atoms from 4 to 15; a phosphate anion; a hydrogen phosphate anion; a dihydrogen phosphate anion; a benzoate anion; a phenolate anion; a phenylacetate anion; a cyanide anion; a fluoride anion; a carbonate anion; a hydrogen carbonate anion; and a formate anion. The method further comprises the interaction of the indicator solution and TNT, for example the interaction of the indicator solution and a solution containing the analyte, and the subsequent photocatalytically induced formation of an anionic sigma complex, which comprises the analyte and the anion. The fluorescent anionic sigma complex is formed by exposure of the indicator solution and analyte having started to interact (interacting) with one another. This is followed by the fluorescence optical detection of the formed anionic sigma complex. Thereafter, a fluorescence signal recorded during the detection is optionally assigned to a quantity of the analyte or to a concentration of the analyte. Preferably, the fluorescence signal is assigned to a concentration of the analyte in a solution. This solution can be a sample extract, for example, wherein the extracted sample can be a soil sample or a water sample, for example.

Briefly summarized, the invention can be characterized as follows:
1. simple preparation of the TNT indicator solution
2. UV-induced photoreaction of TNT with anions
3. detection of TNT by means of fluorescence enhancement
4. highly selective detection of TNT
5. quantitative detection of TNT
6. sensitive detection of TNT
7. selective detection of TNT in a complex mixture of dinitroaromatics and trinitroaromatics
8. detection of TNT in the air, in a solution and as a swipe sample
9. option of internal referencing Even though specific embodiments have been shown and described herein, it is within the scope of the present invention to suitably modify the shown embodiments, without departing from the scope of protection of the present invention. The following claims represent a first, non-binding attempt to define the invention in general terms.

The invention claimed is:

1. A method for detecting an analyte comprising 2,4,6-trinitrotoluene, comprising: —providing an indicator solution, comprising a cation, an anion and a polar solvent; —interacting the indicator solution with the analyte; —photocatalytically induced forming of a complex, comprising the analyte and the anion, by means of UV exposure of the indicator solution interacting with the analyte; and fluorescence optically detecting the formed complex.

2. The method according to claim 1, wherein the cation is selected from: a tetraalkylammonium cation, a trialkylammonium cation, and a dialkylammonium cation.

3. The method according to claim 1, wherein the anion is selected from:
an acetate anion;
a propionate anion;
a butyrate anion;
a carboxylate anion including a number of carbon atoms from 4 to 15;
a phosphate anion;
a hydrogen phosphate anion;
a dihydrogen phosphate anion;
a benzoate anion;
a phenylacetate anion;
a phenolate anion;
a cyanide anion;
a fluoride anion;
a carbonate anion;
a hydrogen carbonate anion; and
a formate anion.

4. The method according to claim 1, wherein the indicator solution comprises a polar, non-fluorescent solvent.

5. The method according to claim 1, wherein, wherein the tetraalkylammonium cation is selected from a tetrabutylammonium cation, a tetrahexylammonium cation and a tetraoctylammonium cation,
and the anion is selected from an acetate anion, a benzoate anion or a phosphate anion.

6. The method according to claim 4, wherein the polar, non-fluorescent solvent is selected from:
N,N-diethylformamide, N,N-dipropylformamide, N,N-dimethylformamide, N,N-dibutylformamide, 1-formylpyrrolidine, dimethyl sulfoxide, diethyl sulfoxide, dipropyl sulfoxide, dibutyl sulfoxide, tetrahydrothiophene 1-oxide, acetamide, N,N-dimethylacetamide, N,N'-diformyl-N,N'-dimethylethylendiamine, N,N-diethylacetamide, 1,4-piperazine dicarboxaldehyde, diformamide derivatives, 1,3,5-triazine-1,3,5(2H,4H, 6H)-tricarboxaldehyde, triformamide derivatives, a polyamide, a polyvinylpyrrolidon, a polyformamide, a polyacrylamide, a poly(N,N-dimethylacrylamide) and a polyethylene glycol, or a mixture of at least two of these.

7. The method according to claim 1, wherein the photocatalytically induced formation of the complex comprises an exposure of the indicator solution interacting with the analyte in a wavelength range of 255 to 300 nm.

8. The method according to claim 1, wherein the fluorescence optical detection includes an excitation of a fluorescence of the formed complex at an excitation wavelength in a range of 400 nm to 500 nm, and a detection of a magnitude of a fluorescence in a range of 550 nm to 700 nm.

9. The method according to claim 8, wherein the magnitude of the fluorescence includes a fluorescence intensity and/or a fluorescence quantum yield.

10. The method according to claim 8, wherein
the recorded magnitude of the fluorescence is assigned to a known quantity or concentration of the analyte, so that a calibration of the method takes place;
the recorded magnitude of the fluorescence is attributed to a known quantity or concentration of the analyte in a solution, so that an at least semi-quantitative determination of the analyte takes place in a sample having an initially unknown concentration of the analyte, wherein the solution is obtained by an extraction of the sample or is the sample itself.

11. The method according to claim 1, wherein a concentration of the anion in the indicator solution is between 20 and 220 mM.

12. The method according to claim 1, wherein the interaction of the indicator solution with the analyte is preceded by an enrichment of the analyte from a sample on a hydrophobic carrier material.

13. The method according to claim 12, wherein the hydrophobic carrier material is selected from: a polybenzyl methacrylate, a polystyrene, a hydrophobized cellulose or a hydrophobized silica material, for example a chromatographic carrier, and Teflon or another hydrophobic material, it being immaterial whether the polybenzyl methacrylate, the polystyrene, the hydrophobized cellulose, the hydrophobized silica material or the other hydrophobic material is present in crosslinked or noncrosslinked form with or without a crosslinking agent.

14. The method according to claim 1, wherein the complex, comprising the analyte and the anion, is a fluorescent anionic TNT sigma complex.

15. Use of UV light for the catalytic formation of an anionic sigma complex, comprising TNT and an anion, selected from an acetate anion, a benzoate anion and a phosphate anion.

16. Use of an anionic sigma complex, comprising TNT and an anion, for the fluorescence optical detection or for the fluorescence optical quantification of TNT in a sample, and in particular in an environmental sample.

17. The use according to claim 16, wherein the anion is selected from:
an acetate anion;
a propionate anion;
a butyrate anion;
a carboxylate anion including a number of carbon atoms from 4 to 15;
a phosphate anion;
a hydrogen phosphate anion;
a dihydrogen phosphate anion;
a benzoate anion;

a phenolate anion;
a phenylacetate anion;
a cyanide anion;
a fluoride anion;
a carbonate anion;
a hydrogen carbonate anion; and
a formate anion.

18. A sensor for fluorescence optical detection of TNT in a fluid, comprising a sensor layer arranged on a substrate, wherein the sensor layer comprises an indicator solution containing a cation, an anion, and at least one polar solvent, wherein the sensor layer is arranged on the substrate, and wherein a complex comprising the analyte and the anion is formed by photocatalytically induced formation, such that the fluid presumably containing TNT is able to interact with the sensor layer and a fluorescence signal resulting from this interaction is optically measurable.

19. The sensor according to claim 18, wherein the cation is selected from: tetraalkylammonium cation, a trialkylammonium cation, and a dialkylammonium cation.

20. The sensor according to claim 18, wherein the anion is selected from: an acetate anion; a propionate anion; a butyrate anion; a carboxylate anion including a number of carbon atoms from 4 to 15; a phosphate anion; a hydrogen phosphate anion; a dihydrogen phosphate anion; a benzoate anion; a phenylacetate anion; a phenolate anion; a cyanide anion; a fluoride anion; a carbonate anion; a hydrogen carbonate anion; and a formate anion.

21. The sensor according to claim 18, wherein the at least one polar solvent is selected from: N,N-diethylformamide, N,N-dipropylformamide, N,N-dimethylformamide, N,N-dibutylformamide, 1-formylpyrrolidine, dimethyl sulfoxide, diethyl sulfoxide, dipropyl sulfoxide, dibutyl sulfoxide, tetrahydrothiophene 1-oxide, acetamide, N,N-dimethylacetamide, N,N'-diformyl-N,N'-dimethylethylendiamine, N,N-diethylacetamide, 1,4-piperazine dicarboxaldehyde, diformamide derivatives, 1,3,5-triazine-1,3,5(2H,4H,6H)-tricarboxaldehyde, triformamide derivatives, a polyamide, a polyvinylpyrrolidon, a polyformamide, a polyacrylamide, a poly(N,N-dimethylacrylamide) and a polyethylene glycol, or a mixture of at least two of these.

22. The method according to claim 1, further comprising the step of assigning a fluorescence signal recorded during the fluorescence optical detection to a quantity or to a concentration of the analyte.

\* \* \* \* \*